Feb. 23, 1932.   L. W. THOMPSON ET AL   1,846,923
REGULATING SYSTEM
Filed Jan. 13, 1930

Inventors:
Louis W. Thompson,
Myron Zucker,
by Charles E. Tullar
Their Attorney.

Patented Feb. 23, 1932

1,846,923

UNITED STATES PATENT OFFICE

LOUIS W. THOMPSON, OF SCHENECTADY, NEW YORK, AND MYRON ZUCKER, OF DETROIT, MICHIGAN, ASSIGNORS TO GENERAL ELECTRIC COMPANY, A CORPORATION OF NEW YORK

REGULATING SYSTEM

Application filed January 13, 1930. Serial No. 420,309.

Our invention relates to regulating systems, and more particularly to load regulating systems.

Regulating systems, such as load regulating systems for maintaining a constant load on electric motor operated machinery, for example wood pulp grinders, depend for their operation upon a device responsive to the power flow through the circuit supplying the motor. Such devices are usually of delicate, complicated and expensive construction, especially when the power circuit is a polyphase circuit. Due to their delicacy and lightness of construction these devices cannot control directly the necessary regulating currents and consequently they are almost invariably associated with a suitable relay, the inclusion of which in the system necessarily adds to its complexity, cost and tendency to unreliability. We have devised a novel load regulating system which uses directly as its power responsive means a novel power responsive induction torque motor which forms the subject matter of our divisional application Serial No. 512,874, filed February 2, 1931, and which is assigned to the assignee of the present application.

It is an object of our invention to provide a new and improved power regulating system.

Our invention will be better understood from the following description taken in connection with the accompanying drawings, and its scope will be pointed out in the appended claims.

Figure 1:
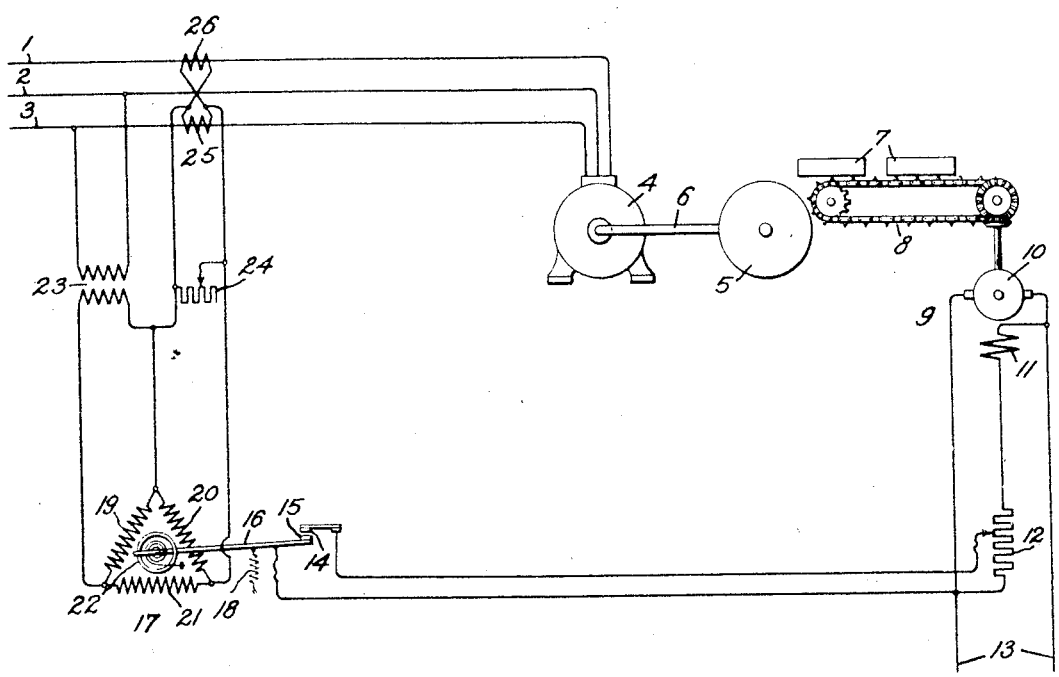
Figure 2:
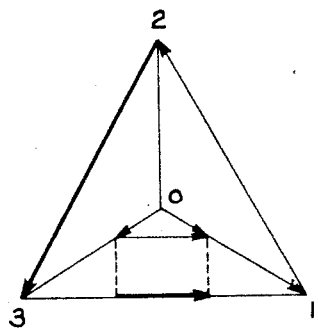
Figure 3:
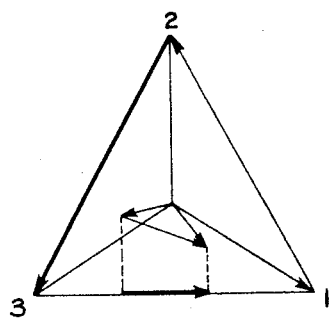

In the drawings, Fig. 1 is a schematic view of our system, while Figs. 2 and 3 are vector diagrams of the current relations in the induction torque motor power responsive device at unity power factor and slightly lagging power factor respectively.

Referring now to Fig. 1, 1, 2 and 3 represent the conductors of a three-phase power circuit which as shown are connected to a motor 4, which may be of any suitable type such as an induction motor or a synchronous motor. Driven by motor 4 is a grinder 5, which is mechanically coupled to motor 4 by any suitable means shown as the shaft 6. The work 7 is fed to grinder 5 by means of an endless conveyor belt 8, which is driven through suitable gearing by a motor 9 having an armature 10 and a shunt field winding 11, in whose circuit is a resistance 12. Motor 9 is supplied with current from supply circuit 13. Connected across a portion of resistance 12 are a pair of contacts 14 and 15, the latter being mounted on a movable arm 16, which is connected to and extends transversely from the shaft of rotor 22 of induction torque motor 17. Spring 18 is connected to arm 16 and serves to normally bias contacts 14 and 15 to their open position. Motor 17 consists essentially of three windings 19, 20 and 21 connected in delta and a short circuited rotor member 22. The actual structural details of this motor, which form no part of the present invention, are shown and described in United States Letters Patent No. 1,743,798 granted January 14, 1930, on an application of R. H. Park. Phase winding 19 is connected across lines 2 and 3 through a suitable potential transformer 23. Phase winding 20 is connected across the terminals of the secondary winding of a current transformer 25 in conductor 3. The secondary winding of a current transformer 26 in line 1 is reversely connected across the terminals of the secondary winding of current transformer 25 so that the voltage across phase winding 20 is proportional to the difference between the currents in lines 1 and 3. Variable resistance 24 is connected across phase winding 20 so that the current flowing through this winding may be adjusted at will.

The induction torque motor 17 operates as follows: Referring to Fig. 2, in which vectors 01, 02 and 03 correspond to phase voltages of conductors 1, 2 and 3 in Fig. 1 it is seen that vector 2—3 represents the voltage between conductors 2 and 3, which may also be considered the voltage across phase winding 19. The small vectors which lie along the vectors 01 and 03 correspond to the voltages in the secondaries of current transformers 26 and 25 respectively. Therefore, the small horizontal vector joining their ends, which represents their vector difference, corresponds to the vector voltage across phase winding 20. For the sake of convenience, this last vector is projected on a line between the characters 1 and 3 of Fig. 2. It will thus be seen that the voltages of phase windings 19 and 20, and consequently their currents have a 60° phase displacement. As phase winding 21 is connected across the interconnected terminals of phase windings 19 and 20 its voltage, and consequently the current through it, will have a 60° phase displacement to the voltages and currents respectively in phase windings 19 and 20 just as is the case with an open delta connected transformer. As a result of the phase displacement of the currents in windings 19, 20 and 21 a rotating field is set up which induces currents in rotor 22 and the reactions of these currents upon the components of the rotating field produces a torque tending to turn rotor 22 in the same direction with the rotating field. As the currents induced in the rotor by the component of the rotating field which is proportional to current is acted upon by the field which is proportional to voltage and vice versa, the torque produced will be proportional to the product of current and voltage, that is to say, to the power flow through the circuit. Referring now to Fig. 3, which shows the voltage vectors which are proportional to the line currents to be lagging the phase voltages or, in other words, which illustrates a condition of lagging power factor on the main supply circuit, it will be seen that the projection of their vector difference on the line joining 1 and 3 is shorter than is the actual length of this difference. It has been found that this shortening provides a substantially accurate power factor correction at power factors which are ordinarily encountered in practical operation. It will thus be seen that an increase in power flow on the three phase circuit supplying motor 4 will cause a counterclockwise torque to be produced by motor 17, thereby tending to cause engagement of contacts 14 and 15, while the decrease in power flow along this circuit will have the opposite effect.

The operation of our system as a whole is as follows: Assume that supply circuit 1, 2, 3 and circuit 13 are properly energized and that contacts 14 and 15 are disengaged. Under these conditions all of resistance 12 will be in circuit with field 11, thereby causing motor 9 to operate at its maximum speed, which in turn causes a maximum amount of work to be fed to grinder 4 and consequently causes a maximum load to be placed on motor 4. As a result the power flow through circuit 1, 2, 3 will increase until the torque of motor 17 overpowers the pull of spring 18 when contact 15 will rise and engage contact 14 thereby short circuiting a portion of resistance 12. This will cause an increase in the current through field 11, thereby decreasing the speed of motor 9, which in turn reduces the amount of work fed to grinder 5 and consequently reduces the load on motor 4. As a result the power flow through circuit 1, 2, 3 decreases, causing a resultant decrease in the torque of motor 17 until spring 18 causes the separation of contacts 14 and 15 when the above regulating cycle will be repeated. It will thus be seen that the action of contact 15 will be vibratory thereby to hold a predetermined average value of resistance in the circuit of field winding 11.

The purpose of adjustable rheostat 24 is to make it possible to vary at will the desired constant load which is to be held on motor 4. Thus, by adjusting this resistance the current through winding 20 may be made the same for various currents in lines 1 and 3 corresponding to various loads on motor 4.

While we have shown and described a particular embodiment of our invention, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In a regulating system, in combination, a three phase circuit, a pair of cooperating contacts, means under the control of said contacts for varying the load on said circuit, a three phase induction motor, means connecting said motor to said circuit so that its torque is substantially proportional to the power flowing through said circuit, and means responsive to the torque of said motor for moving said contacts in such a way as to maintain a substantially constant power flow through said circuit.

2. In combination, a three phase power circuit, a motor connected thereto, means under the control of a pair of contacts for varying the load applied to said motor, a three phase induction motor, one of whose phase windings is connected to be energized by a voltage which is proportional to the voltage between two of the lines of said circuit, another of whose windings is energized by a voltage which is proportional to the difference between the currents in the remaining line and one of the first mentioned lines, and means for opening and closing said contacts in response to movements of the rotor of said induction motor.

3. In a load regulating system, in combination, a three phase circuit, a grinder motor connected thereto, a grinder mechanically coupled to said motor, means for feeding variable quantities of work to said grinder, said means including a variable speed motor for regulating the rate of feed of said work, a pair of contacts, means connecting said contacts to the field winding of said last mentioned motor so that engagement thereof will short circuit a portion of said field winding, an induction torque motor, means connecting the rotor of said induction torque motor to one of said contacts so that the torque of said motor tends to close said contacts, means biasing said contacts to open position, and means connecting said induction torque motor to said circuit in such a way that its torque is proportional to the power flow through said circuit.

4. In combination, a power supply circuit, a load device connected thereto, a variable speed electric motor, means for varying the load on said load device in proportion to variations in the speed of said motor, and power responsive means including a pair of vibratory contacts for maintaining the average speed of said motor at such a value that the load value of said load device remains substantially constant.

5. In combination, a power supply circuit, a load device connected thereto, an electric motor for controlling the load value of said load device, said motor having a field winding, a resistance in circuit with said field winding, said resistance being of such a value that when it is short circuited the motor speed is so low that the load value of the load device is below a predetermined value and when it is all in the field circuit the motor speed is so high that the load value of said load device is higher than said predetermined value, and means responsive to the power flow through said supply circuit for short circuiting said resistance when the power flow through said circuit exceeds said predetermined value.

6. A load regulating system for a pulp grinder comprising, in combination, an alternating current power supply circuit, a motor operated grinder connected thereto, means including an electric motor for varying the load on said grinder in proportion to the speed of said motor, a pair of contacts connected to said motor in such a way that when they are closed the motor speed is so low that the load on said grinder is below a predetermined value and when they are open the motor speed is so high that the load on said grinder is above said predetermined value, means biasing said contacts to their open position, and means connected to be responsive to the power flow through said circuit for closing said contacts when the power flow exceeds said predetermined value whereby said motor is operated at an average speed which corresponds to said predetermined load on said grinder.

In witness whereof, we have hereunto respectively set our hands this 6th day of January, 1930, and this 8th day of January, 1930.

LOUIS W. THOMPSON.
MYRON ZUCKER.